United States Patent
Ahmad et al.

(10) Patent No.: US 7,693,606 B2
(45) Date of Patent: Apr. 6, 2010

(54) DIAGNOSTICS FOR MASS FLOW CONTROL

(75) Inventors: Anis Ahmad, Eden Prairie, MN (US); Garrie David Huisenga, Chaska, MN (US)

(73) Assignee: Rosemount Inc., Eden Prairie, MN (US)

( * ) Notice: Subject to any disclaimer, the term of this patent is extended or adjusted under 35 U.S.C. 154(b) by 149 days.

(21) Appl. No.: 12/004,661

(22) Filed: Dec. 21, 2007

(65) Prior Publication Data

US 2009/0164050 A1 Jun. 25, 2009

(51) Int. Cl.
G05D 7/00 (2006.01)
G05B 13/02 (2006.01)
G05B 9/02 (2006.01)
G01F 1/00 (2006.01)
G01F 11/30 (2006.01)

(52) U.S. Cl. ............... 700/282; 700/28; 700/42; 700/45; 700/51; 700/79; 702/45; 702/183

(58) Field of Classification Search ........... 700/3, 700/9, 10, 28, 29, 32, 42, 45, 51, 79, 80, 700/282, 289; 702/45, 183–185; 137/10, 137/87.03

See application file for complete search history.

(56) References Cited

U.S. PATENT DOCUMENTS

| | | | |
|---|---|---|---|
| 3,757,808 | A | 9/1973 | Peterson et al. |
| 5,190,068 | A | 3/1993 | Philbin |
| 5,193,406 | A | 3/1993 | Wolf et al. |
| 5,927,321 | A | 7/1999 | Bergamini |
| 6,272,401 | B1 | 8/2001 | Boger et al. |
| 6,397,114 | B1 | 5/2002 | Eryurek et al. |
| 6,453,261 | B2 | 9/2002 | Boger et al. |
| 6,466,880 | B2 | 10/2002 | Cunningham et al. |
| 6,535,826 | B2 | 3/2003 | Cunninghams et al. |
| 6,539,968 | B1 | 4/2003 | White et al. |
| 6,601,005 | B1 | 7/2003 | Eryurek et al. |
| 6,745,084 | B2 | 6/2004 | Boger et al. |
| 6,745,107 | B1 * | 6/2004 | Miller ............... 700/282 |
| 6,804,600 | B1 * | 10/2004 | Uluyol et al. ............... 701/100 |
| 6,997,162 | B2 | 2/2006 | Hirayama et al. |
| 7,010,459 | B2 | 3/2006 | Eryurek et al. |

(Continued)

OTHER PUBLICATIONS

International Search Report dated Feb. 17, 2009 from the International Searching Authority for corresponding PCT Application No. PCT/US2008/013763 filed Dec. 16, 2008 (2 pages).

(Continued)

Primary Examiner—Sean P Shechtman
(74) Attorney, Agent, or Firm—Kinney & Lange, P.A.

(57) ABSTRACT

A flow control system comprises a flow sensor, a valve controller, a signal processor, a control processor and an interface. The flow sensor generates a sensor signal characterizing a flow rate. The valve controller controls the flow rate as a function of a control output. The signal processor converts the sensor signal into a flow signal characterizing the flow rate as a function of time, and the control processor generates the control output as a function of a setpoint and the flow signals. The interface receives an input representative of the setpoint, transmits a flow output representative of the flow signals, and transmits a diagnostic output directly indicative of an operational condition of the flow control system.

22 Claims, 4 Drawing Sheets

U.S. PATENT DOCUMENTS

| | | |
|---|---|---|
| 7,069,944 B2 * | 7/2006 | Morikawa et al. ........ 137/487.5 |
| 2003/0125841 A1 * | 7/2003 | Schlosser .................... 700/282 |
| 2003/0234045 A1 | 12/2003 | Shajii et al. |
| 2005/0189018 A1 | 9/2005 | Brodeur et al. |
| 2007/0010900 A1 | 1/2007 | Kavaklioglu et al. |
| 2007/0191990 A1 * | 8/2007 | Duan et al. ................. 700/282 |

OTHER PUBLICATIONS

Written Opinion of the International Searching Authority dated Feb. 17, 2009 for corresponding PCT Application No. PCT/US2008/013763 filed Dec. 16, 2008 (5 pages).

* cited by examiner

DIAGNOSTICS FOR MASS FLOW CONTROL

BACKGROUND

This invention relates generally to fluid processing, and specifically to diagnostic techniques for flow control systems. The diagnostic techniques are directed toward flow obstructions, corrosion, wear and tear on electromechanical valve components, and other forms of electromechanical deterioration or flow control impairments.

Safe, accurate, and cost-effective flow control is critical to a wide range of industrial, engineering, and scientific processes. Mass-based flow control systems have substantial utility in these areas, particularly in applications such as semiconductor fabrication and pharmaceutical manufacturing, where precise and absolute flow control is required. A primary advantage of mass-based flow control systems is that they operate substantially independently of pressure and temperature effects, making them less susceptible to environmental bias and related systematic concerns that characterize other, more traditional flow control technologies.

A typical mass flow control system includes an upstream thermal mass flow meter and a downstream valve controller. The thermal mass flow meter comprises a heat source and (usually two) temperature sensors, such as thermocouples or resistance-temperature devices (RTDs), arranged along a sensor tube. The valve controller typically includes a valve coil assembly or similar structure, configured to control the process flow by positioning or actuating a valve.

The heat source and the temperature sensors are thermally coupled to the sensor tube, which is typically a bypass flow tube running parallel to a main process flow. The heat source imparts thermal energy to the fluid in the sensor tube, creating a differential signal across the temperature sensors. The flow through the sensor tube is a function of the temperature differential, and the total process flow is a function of the flow through the sensor tube. Thus the temperature differential signal characterizes the total process flow rate. The process flow is controlled by the valve coil assembly, which positions a valve plunger downstream of the flow sensor.

A functional relationship between the mass flow rate and the temperature differential is determined by the conservation of thermal energy and the geometry of the flow sensor. This relationship is substantially independent of the fluid's pressure and temperature, providing for precise and absolutely calibrated control of process fluid flow. In particular, mass-based flow control systems are inherently less sensitive to environmental bias and other systematic effects than volumetric, differential pressure, or velocity-based systems.

Mass flow controllers are, however, susceptible to certain operational impairments related to their precision measurement and control mechanisms. These include flow obstructions and corrosion, such as in the sensor tube, and deterioration of electromechanical components, particularly in the valve controller. Mass flow control systems thus require regular maintenance, which is traditionally based on service hours, number of valve cycles or excursions, and other life expectancy-related measures.

Unfortunately these measures are indirect, rather than direct, indicators of the system's actual operational condition. While service hours and valve cycles may be statistically associated with operational impairments, that is, they provide little direct indication of any particular device's actual physical condition. This forces a tradeoff between maintenance costs and failure risk, as expressed in an idealized service life expectancy.

In order to capture devices that actually suffer operational impairments, this tradeoff necessarily requires the regular replacement of other, fully serviceable components as well. This is characteristic not only of service hour and valve cycle-based maintenance programs, but of any diagnostic technique that relies on indirect, rather than direct, operational indicators. Indirect techniques may also fail to address the reality of widely variable operating conditions, which can significantly affect failure probabilities.

There is thus a need for flow diagnostic techniques that are more directly indicative of actual operational conditions, and which can facilitate efficient, cost-effective maintenance programs. The techniques should be directly indicative of specific operational conditions such as flow obstructions, corrosion, wear and tear, electromechanical deterioration, and other operational impairments, and should be independent of indirect indicators based on service life expectancy. The diagnostics techniques should also be applicable on an individual basis, without reference to other process devices, and should be easily integrated into existing process control systems without the need for substantial modifications.

SUMMARY

A flow control system generates a diagnostic output that is directly indicative of the system's operational condition. The flow control system comprises a flow sensor, a valve controller, a signal processor, a control processor and an interface. The flow sensor generates an analog sensor signal characterizing a process flow rate, and the valve controller controls the flow rate as a function of a control output. The signal processor converts the analog sensor signal into flow signal, where the flow signal characterizes the flow rate as a function of time. The signal processor may also generate a flow diagnostic signal that is directly indicative of the operational condition of the flow sensor.

The control processor generates the control output as a function of a target flow rate or "setpoint," and may also generate a control diagnostic signal that is directly indicative of the operational condition of the valve controller. The interface receives an input representative of the setpoint, and transmits an output representative of the flow signal, and representative of either the flow diagnostic signal, the control diagnostic signal, or both diagnostic signals.

The flow diagnostic signal may be generated as a function of a statistical analysis performed on the flow signal. The statistical analysis typically includes a mean and a standard deviation, and is directly representative of flow obstructions, corrosion, and other flow impairments. The control diagnostic signal may be generated as a function of a control/compensation algorithm performed on the setpoint with respect to the flow signal. The algorithm typically includes a proportional-integral-derivative (PID) routine, and generates a diagnostic signal such as a valve response function that is directly representative of wear and tear on valve coil components, electromechanical deterioration, and other operational impairments.

The flow sensor may be a mass flow sensor, and specifically a thermal mass flow sensor that characterizes the process flow as a function of flow through a bypass tube or sensor tube. The flow controller may be a valve positioner or valve actuator, and specifically a valve coil assembly that controls the process flow by positioning a plunger. The flow controller may also be a Coriolis mass flow meter.

The signal processor and the control processor may be included within an electronics module, along with an analog-to-digital (A/D) converter, a digital-to-analog (D/A) converter, a microprocessor, and the interface. The A/D digitizes the analog sensor signal when clocked by the microprocessor, and the microprocessor generates the flow signal as a function of the digitized sensor signals. The microprocessor also generates a digital control signal as a function of the setpoint and the flow signals, clocks the D/A to generate the (analog) control output, and generates at least one of the flow diagnostic signal and the control diagnostic signal.

A method of flow control comprises generating a flow signal that characterizes a process flow rate as a function of time, receiving an input representative of a setpoint for the flow rate, controlling the flow rate as a function of the setpoint and the flow signal, generating a diagnostic signal that is directly indicative of an operational condition of flow control, and transmitting an output representative of the flow signal and the diagnostic signal. The diagnostic signal may incorporate an inverse signal-to-noise ratio of the flow signal, or a response function generated by a proportional-integral-derivative (PID) routine performed on the setpoint as compared to the flow signal, or a combination of such ratios and response functions.

DETAILED DESCRIPTION

Figure 1:
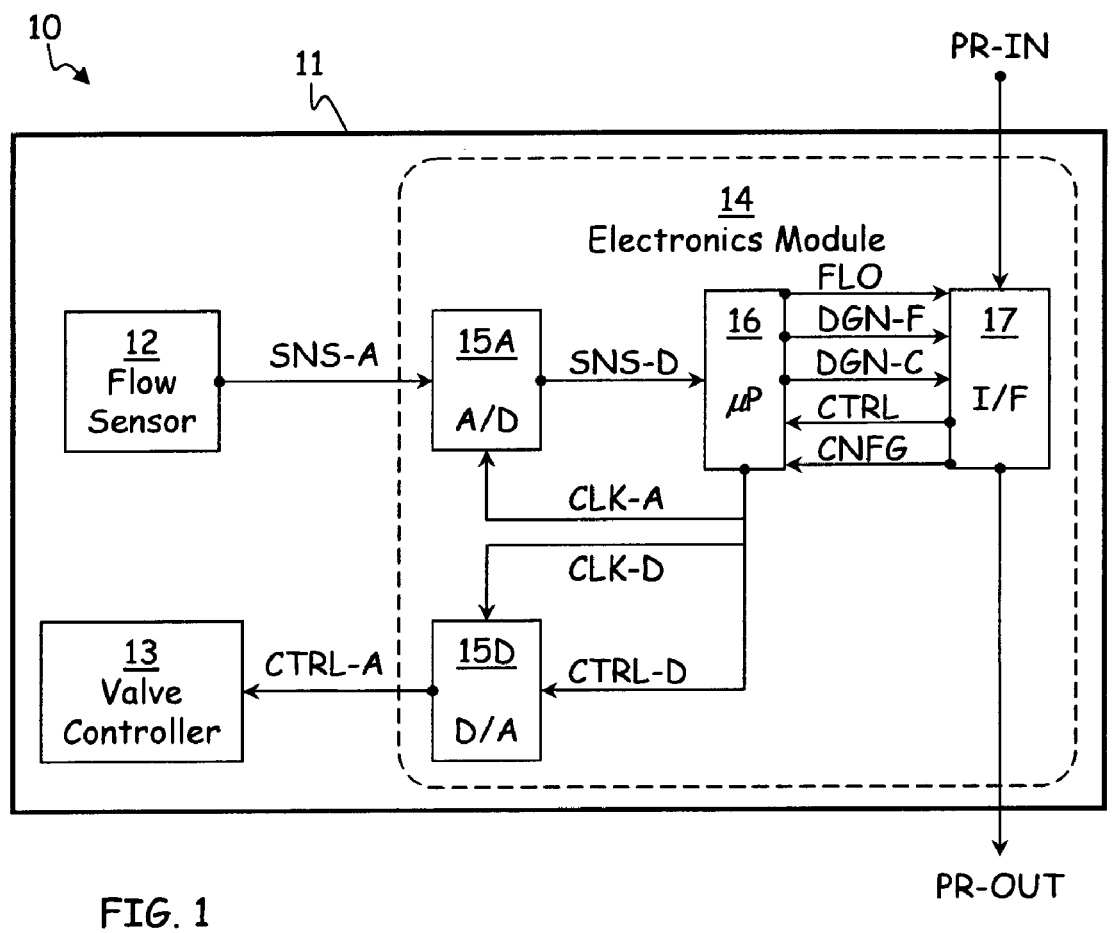
FIG. 1 is a block diagram of a flow control system configured to generate diagnostic signal directly indicative of the flow controller's operational condition.

FIG. 1 is a block diagram of flow control system 10, configured to generate a diagnostic signal directly indicative of the flow controller's operational condition. In this embodiment flow meter 10 comprises housing 11, flow sensor 12, valve controller 13, and electronics module 14.

Housing 11 is typically manufactured of a durable material such as metal or a durable plastic, or a combination of such materials. The housing comprises mounting structures configured to secure internal components including flow sensor 12, valve controller 13 and electronics module 14, and to couple the flow sensor and the valve controller to a process device through which a process fluid flows. Housing 11 also insulates the internal components, shields from adverse environmental conditions such as moisture and corrosive or explosive agents, and protects from contact with process machinery, tools, falling objects, and other potential hazards.

Flow sensor 12 is configured to generate an analog sensor signal characterizing a flow rate through a sensor tube. In one embodiment, flow sensor 12 comprises a thermal mass flow meter and the sensor tube comprises a bypass flow tube. In other embodiments the sensor tube may also be a main flow passage, such that there is only one process flow path through the device such as in a Coriolis flow meter.

Valve controller 13 is configured to control the process flow rate by positioning or actuating a valve. In one embodiment, valve controller 13 comprises a valve coil assembly configured to position a plunger. In alternate embodiments, the valve controller may comprise another form of valve positioner or valve actuator. Valve controller 13 may be located downstream of the flow sensor, or upstream of flow sensor 12.

Electronics module 14 comprises analog-to-digital converter (A/D) 15A, digital-to-analog converter (D/A) 15D, microprocessor 16 and interface (I/F) 17. The electronics module may also comprise pre-amplifier components for pre-amplifying the analog signal from flow sensor 12.

In an integrated flow controller embodiment of system 10, housing 11 and electronics module 14 are unitary elements, and flow sensor 12, valve controller 13 and electronics module 14 comprise a single flow control device within unitary housing 11 (see FIG. 2, below). In other embodiments system 10 may comprise a distinct flow sensing device and a distinct valve control device, or a number of distinct process devices. A variety of such devices, including flow meters, valve controllers and integrated flow controllers, are available from Rosemount, Inc., of Chanhassen, Minn., a division of Emerson Process Management, and from other commercial vendors.

A/D 15A digitizes the analog signal from sensor module 12. A/D 15A may comprise a linear A/D, a bilinear A/D, or non-linear A/D, as appropriate to the particular scale range and sensitivity of flow sensor 12. A/D 15A may further comprise a flash A/D, or may utilize sigma-delta modulation or another generally available analog-to-digital conversion architecture.

D/A converter 15D generates a control output for valve controller 13. Similarly to A/D converter 15A, D/A converter 15D may utilize a variety of digital-to-analog conversion architectures. In an embodiment where valve controller 13 comprises a valve coil assembly, for instance, D/A converter 15D may generate a control output comprising a pulse-width modulated current output. In alternate embodiments D/A converter 15D may generate an analog current output, such as a standard analog output of approximately four to approximately forty milliamps (4-40 mA), or an analog voltage output. D/A converter 15D may further be coupled with an electromechanical device to generate another form of control output, such as a pneumatic pressure.

Microprocessor 16 clocks A/D 15A and D/A 15D, and generates a flow signal that characterizes the process flow rate as a function of time. The microprocessor may also generate a flow diagnostic signal indicative of an operation condition of the flow sensor, or a control diagnostic signal indicative of an operational condition of the valve controller. Microprocessor 16 may further provide A/D and D/A conversion factors such as conversion scale or bilinear break point, may generate date/time stamp information, and may linearize the sensor signals, re-range the flow meter, or adjust damping characteristics of a flow control algorithm (see the description of FIG. 3, below).

Interface (I/F) 17 transmits a process output and receives a process input. The process output is representative of the flow signal and at least one of the flow diagnostic signal or the control diagnostic signal. The process input is representative of the setpoint and of configuration parameters such as the units in which flow is measured.

I/F 17 may communicate the process input and process output via a hand-held controller, with a remote operator, or with an automated process control system. The interface may utilize a standard 4-20 mA analog communications protocol, a digital Fieldbus or Profibus protocol, or a hybrid protocol such as HART, in which digital output is superposed upon a standard analog output. I/F 17 may also communicate via a wireless radio-frequency (RF) signal, for example a 902-928

MHz signal compatible with a HART-based 1420 Wireless gateway, as available from Emerson Process Management.

In operation of control system 10, flow sensor 12 generates analog sensor signal SNS-A characterizing the process flow rate. Microprocessor 16 clocks A/D 15A via clock signal CLK-A, and A/D 15A generates digital sensor signal SNS-D. Microprocessor 16 then generates a flow signal as a function of digital sensor signal SNS-D, such that the flow signal characterizes the process flow rate as a function of time.

Microprocessor 16 also generates flow output FLO, which is representative of the flow signal, and may generate flow diagnostic output DGN-F as a function of a statistical analysis performed on the flow signal. The statistical analysis typically incorporates a mean and a standard deviation, and the diagnostic output may represent an inverse signal-to-noise ratio relating the standard deviation to the mean.

Interface (I/F) 17 receives process input PR-IN, which comprises configuration input CNFG and control input CTRL. Configuration input CNFG is representative of the units in which the process flow rate is determined, and may represent other configuration parameters as well. Control input CTRL is representative of a target flow rate or setpoint for the process flow.

Microprocessor 16 generates digital flow control signal CTRL-D as a function of the setpoint, and clocks D/A 15D via clock signal CLK-D such that the D/A generates control output CTRL-A for valve controller 13. The microprocessor may also generate control diagnostic output DGN-C as a function a closed-loop control/compensation algorithm performed on the setpoint as compared to the flow signal. I/F 17 then transmits process output PR-OUT, which comprises flow output FLO and at least one of flow diagnostic output DGN-F or control diagnostic output DGN-C.

Figure 2:
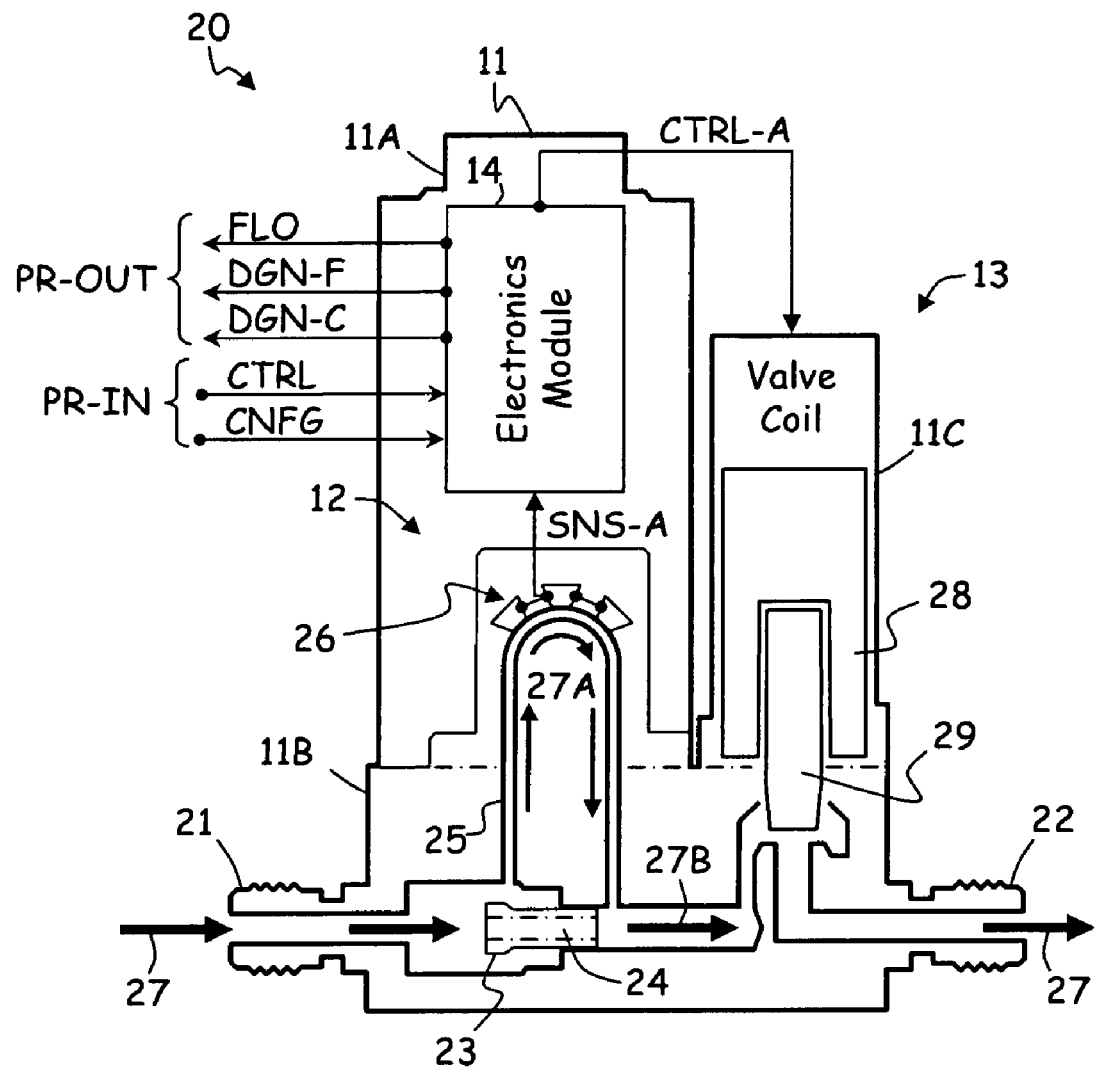
FIG. 2 is a cross-sectional schematic illustrating an integrated mass flow controller embodiment of the flow control system in FIG. 1

FIG. 2 is a cross-sectional schematic illustrating flow controller 20, which is an integrated mass flow controller embodiment of flow control system 10. Flow controller 20 comprises housing 11, flow sensor 12, valve controller 13, and electronics module 14.

Housing 11 is comprised of a durable material such as a metal or durable plastic, or a combination of such materials. Housing 11 comprises electronics cover 11A, mounting block 11B and valve coil assembly cover 11C.

Figure 4:
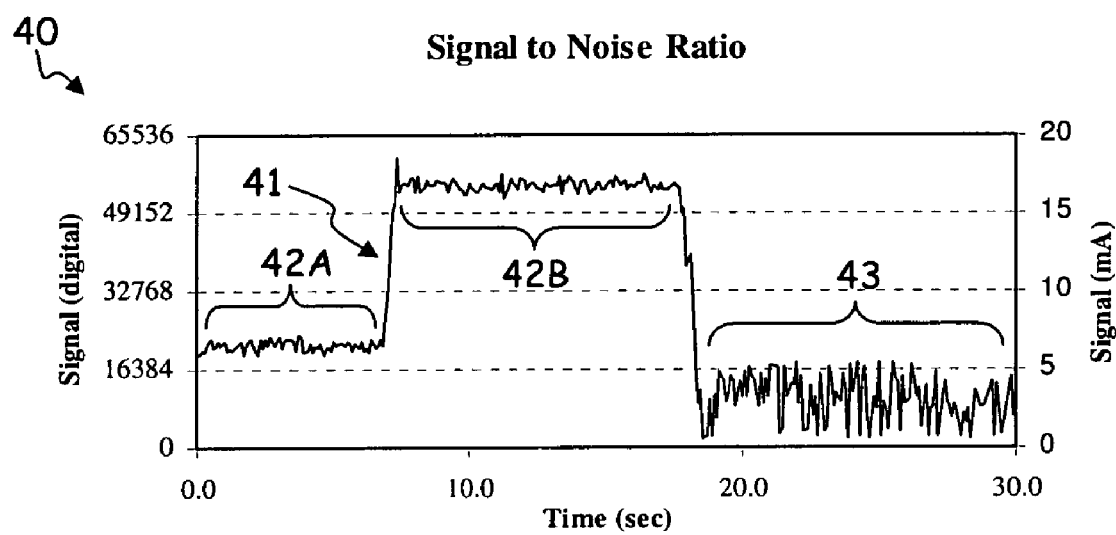
FIG. 4 is a plot of a flow signal versus time, illustrating a time-dependent noise component directly indicative of a flow obstruction.

Mounting block 11B comprises inlet connector 21 and outlet connector 22. Connectors 21, 22 may comprise threaded compression fittings, threaded pipe fittings, flush mount connectors, or another form of flow connector. The connectors may be male, as shown in FIG. 4, or female, and may have a wide range of sizes. Connectors 21, 22 may further appear on side surfaces of mounting block 11B, as shown in FIG. 2, on a bottom surface of mounting block 11B, or on other surfaces of flow meter 20.

Flow sensor 12 comprises flow restrictor 23, main flow passage 24, bypass flow tube (or sensor tube) 25 and sensor elements 26. Process fluid flow 27 divides at flow restrictor 23 into bypass flow 27A, through bypass flow tube/sensor tube 25, and main flow 27B, through main flow passage 24. Sensor elements 26 are distributed along sensor tube 25, and configured to generate analog sensor signal SNS-A. Sensor signal SNS-A characterizes the total process flow as a function of bypass flow 27A through sensor tube 25.

In the embodiment of FIG. 2, valve controller 13 comprises a valve coil assembly, which in turn comprises valve coil 28 and valve plunger 29. The valve coil assembly controls total process flow 27 (that is, bypass flow 27A plus main flow 27B) as a function of control output CTRL-A. Specifically, control output CTRL-A energizes valve coil 28, which positions plunger 29 and restricts the flow.

Electronics module 14 comprises a microprocessor, an A/D converter, and a D/A converter, each as described above with respect to FIG. 1. These components in turn comprise a signal processor, which processes sensor signal SNS-A to generate flow output FLO, and a control processor, which processes control input CTRL to generate control output CTRL-A. The signal processor and the control processor also generate at least one of a flow diagnostic signal or a control diagnostic signal, as detailed below with respect to, FIGS. 2 and 3.

Electronics module 14 also comprises an interface (I/F). The interface receives process input PR-IN, comprising control input CTRL and configuration input CNFG, and transmits process output PR-OUT, comprising flow output FLO and at least one of diagnostic outputs DGN-F and DGN-C.

For integrated mass flow controller 20, sensor elements 26 comprise an upstream temperature sensor to measure upstream temperature $T_1$, a downstream temperature sensor to measure downstream temperature $T_2$, and a heater element or heater coil. The heater element imparts thermal energy to bypass flow 27A in sensor tube 25, establishing temperature differential $\Delta T = T_2 - T_1$ between the upstream and downstream sensors. The temperature differential is related to rate of bypass flow 27A by the conservation of thermal energy.

In operation of the flow controller, temperature differential $\Delta T$ is provided to electronics module/signal processor 14 via analog sensor signal SNS-A. The signal processor converts sensor signal SNS-A into a flow signal that characterizes total process flow 27 (bypass flow 27A plus main flow 27B) as a function of time. The conversion employs a set of calibration parameters that account, for example, for the analog-to-digital conversion scale and the geometrical relationship between bypass flow 27A through sensor tube 25 and main flow 27B through main flow passage 24.

The thermal sensors may be coupled to an exterior surface of sensor tube 25, as indicated in FIG. 2, with the heat source typically positioned between the upstream and downstream temperature sensors. A variety of alternate geometries are also possible, including configurations in which sensor elements are positioned directly in the flow, and configurations in which sensor tube 25 comprises main flow passage 24, such that there is only one process flow path through the flow controller.

Flow controller 20 and system 10 distinguish from the prior art by the configuration of electronics module 14, which provides at least one of flow diagnostic output DGN-F or control diagnostic output DGN-C. Specifically, these diagnostic outputs are not limited to indirect measures such as service hours or valve cycles, but instead represent more direct indicators of the flow controller's actual operational condition. Flow diagnostic output DGN-F, for example, may represent an inverse signal-to-noise ratio that is directly indicative of flow obstructions, corrosion, or other operational impairments of the flow controller. Similarly, control diagnostic DGN-C may represent a response function that is directly indicative of electromechanical wear and tear, electromechanical deterioration, or other flow controller impairments.

Additionally, electronics module 14 provides an interface configured for a standard analog, HART, Fieldbus or other widely-used process communications protocol. This interface facilitates integration of flow controller 20 (or, alternatively, flow control system 10) into existing process control systems, without the need for additional hardware modifications or cross-references to other, external process signals. The result is an independent and individualized diagnostic tool that reflects the actual operating condition of the process device, rather than its idealized remaining service life expectancy. This facilitates an efficient maintenance program that can reduce unnecessary downtime and more cost-effectively utilize system resources.

Figure 3:
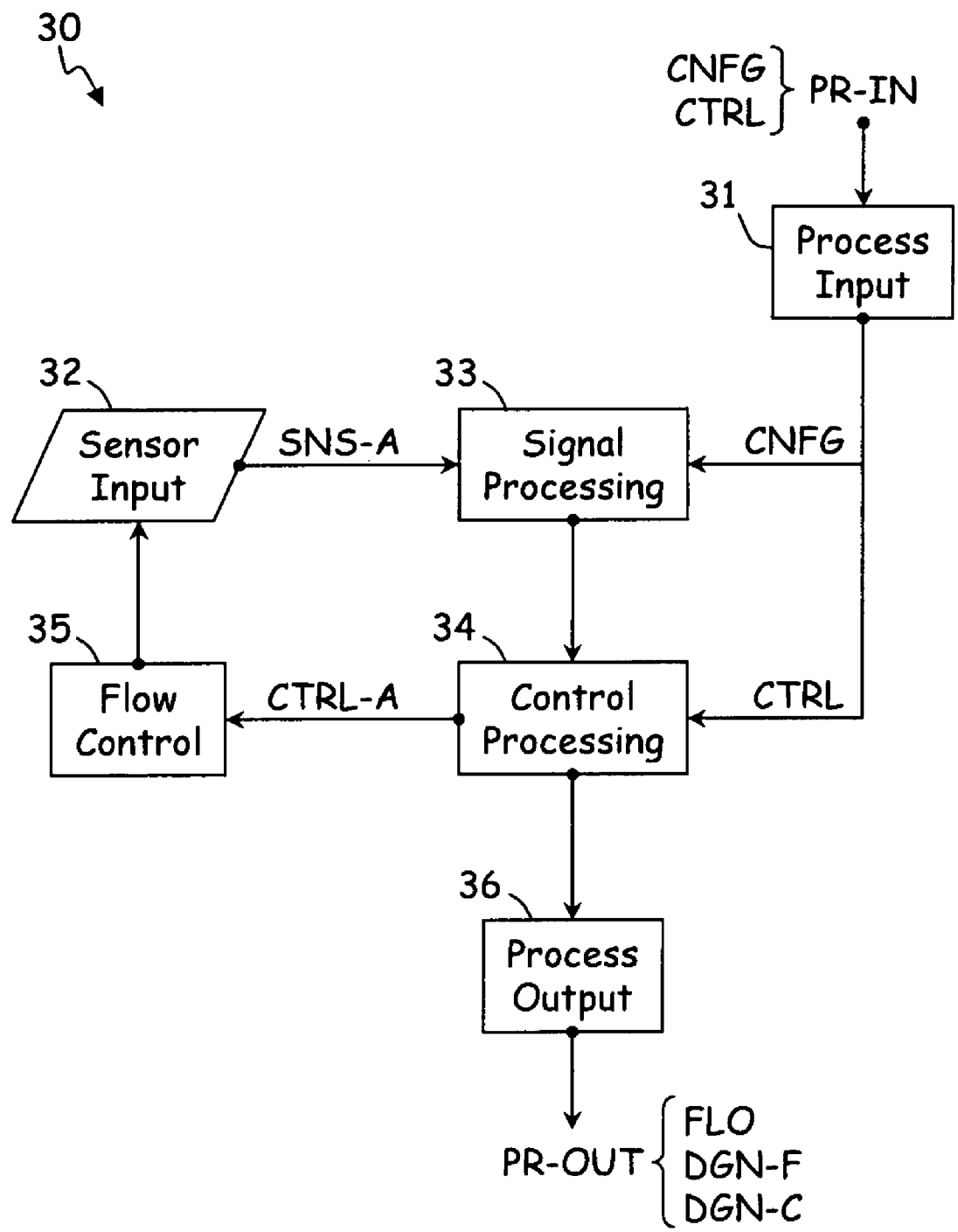
FIG. 3 is a flowchart illustrating a control/compensation algorithm for the flow control system of FIG. 1.

FIG. 3 is a flowchart illustrating closed-loop control/compensation algorithm 30 for flow control system 10 or integrated flow controller 20. Algorithm 30 comprises process input (step 31), sensor input (step 32), signal processing (step 33), control processing (step 34), flow control (step 35), and process output (step 36).

Process input (step 31) comprises receiving process input PR-IN via an interface (I/F). Process input PR-IN comprises control input CTRL and configuration input CNFG. Control input CTRL is representative of setpoint $s_0$, the target value for the process flow rate. Configuration input CNFG is representative of the units in which flow is measured, or other configuration parameters such as a digital device address, date and time stamp information, or physical characteristics related to the process fluid. The configuration input may also represent a re-zeroing configuration for the flow controller, corresponding to a state of zero process flow.

Sensor input (step 32) comprises generating analog sensor signal SNS-A via a flow sensor. Analog sensor signal SNS-A characterizes a process flow rate as a function of the flow rate through a sensor tube, as described above with respect to flow sensor 12 of FIG. 2.

Signal processing (step 33) comprises generating a flow signal via a signal processor, where the flow signal characterizes the process flow rate as a function of time. The signal processor clocks an A/D converter to digitize analog sensor SNS-A, and generates the flow signal as a function of the digitized sensor signal and a set of calibration parameters. The calibration parameters account for the analog-to-digital conversion scale and the geometrical relationship between the total process flow rate and the flow through the sensor tube. Signal processing also generates flow output FLO, as representative of the flow signal, and may generate flow diagnostic output DGN-F, as representative of a statistical analysis performed on the flow signal.

Control processing (step 34) comprises generating control output CTRL-A via a control processor. The control processor generates a digital control signal as a function of the setpoint, and clocks a D/A converter to convert the digital control signal to (analog) control output CTRL-A. Control processing may also generate control diagnostic output DGN-C, as representative of a control/compensation algorithm performed on setpoint $s_0$ and the flow signal.

Flow control (step 35) comprises controlling the process flow rate via a valve controller. The valve controller may comprise a valve coil assembly and the control output may comprise a pulse-width modulated current output, or they may take other forms as described above with respect to valve controller 13 of FIG. 2.

Process output (step 36) comprises transmission of process output PR-OUT via the interface. The process output comprises flow output FLO, and at least one of flow diagnostic output DGN-F or control diagnostic output DGN-C. Flow output FLO is representative of the flow signal, and may represent, for example, a mean $<s>$ of a subset $\{s_i\}$ representing a flow signal analysis window (that is, the mean of the flow signal over the analysis window), a last-in-time flow signal $s_n$ in subset $\{s_i\}$, or another representative function of the flow signal. Diagnostic outputs DGN-F and DGN-C are directly indicative of an operational condition of the flow meter. The diagnostic outputs may be representative, for example, of an inverse signal-to-noise ratio or a valve response function. Both process output (step 36) and process input (step 31, above) may be accomplished via a standard 4-20 mA analog protocol, a digital protocol such as Profibus or Fieldbus, a hybrid protocol such as HART, or a wireless protocol, as described with respect to I/F 17 of FIG. 1.

Functionally, sensor input (step 32), signal processing (step 33), control compensation (step 34), and flow control (step 35) comprise a closed-loop subroutine. Process input (step 31) may be performed either synchronously or asynchronously with respect to the closed-loop subroutine; for example, on startup, reset, or upon an asynchronous change in control input CTRL. Process output (step 36) is typically synchronous with control compensation (step 34), as indicated in FIG. 3, but may also be performed synchronously with respect to another step in the closed-loop subroutine, or asynchronously with respect to the subroutine.

In signal processing (step 33), the flow signal is generated from analog sensor signal SNS-A based upon the set of calibration parameters (see the discussion of FIG. 2). Typically, the calibration parameters represent factory calibrations stored on a memory buffer or similar device within the electronics module. Alternatively, configuration input CNFG may be representative of additional operationally defined calibration parameters, providing additional field-based calibration functionality.

Flow diagnostic output DGN-F is representative of a statistical analysis performed on analysis window/subset $\{s_i\}$, in which individual elements $s_i$ are sampled from the flow signal at discrete times. Analysis window $\{s_i\}$ typically comprises a quasi-continuous subset of individual signals $s_i$, sampled over a time span that is relatively large as compared to the A/D clocking rate (the rate at which analog signal SNS-A is digitized; see FIG. 1, above), and relatively small as compared to the process response time scale (the time required to achieve changes in the flow rate; see FIG. 4, below).

The statistical analysis will generally comprise a mean and a standard deviation of the flow signal as determined over analysis window/subset $\{s_i\}$. The mean is given by:

$$<s> = \sum_i \frac{s_i}{n}, \quad [1]$$

where the summation runs over n individual elements $s_i$ in subset/analysis window $\{s_i\}$. The standard deviation is determined as a function of the mean; namely, $$\sigma = \sqrt{<s^2> - <s>^2}, \quad [2]$$

where $<s>^2$ is the square of mean $<s>$ and $<s^2>$ is the mean square, as defined by:

$$<s^2> = \sum_i \frac{s_i^2}{n}. \quad [3]$$

Again, the summation runs over the n elements of analysis window $\{s_i\}$.

The object of the flow diagnostic signal is to directly indicate an operational condition of the flow control system, such as obstructed flow, corrosion or other operational impairment. Typically, such impairments are manifested by a relatively large noise component, making an inverse signal-to-noise ratio an appropriate diagnostic signal. The inverse signal-to-noise ratio may be, for example, simply the ratio of standard deviation σ to mean <s>; that is:

$$R^{-1} = \sigma/<s>. \quad [4]$$

Control processing (step 34) is preferably executed as a component of a proportional-integral-derivative (PID) control/compensation routine. The PID routine is performed on setpoint $s_0$, as compared to the flow signals. Specifically, the PID routine determines the control output as a function of a difference (or "error") $s_E$, which in turn is determined by setpoint $s_0$ as compared to a representative flow signal. For example, $$s_E = s_0 - s_n, \quad [5]$$

where representative flow signal $s_n$ is a last-in-time flow signal; that is, the nth element of analysis window $\{s_i\}$. In alternate embodiments error $s_E$ may be determined with respect to mean <s> as determined over the analysis window, with respect to a time-delayed flow signal, or with respect to another representative function of the flow signal.

The PID function comprises a proportional component, an integral component, and a derivative component. The proportional component is directly proportional to error $s_E$, and accounts for any difference between setpoint $s_0$ and representative flow signal $s_n$. The integral component is proportional to an integral of error $s_E$ over many iterations of the closed-loop subroutine portion of algorithm 30, and accounts for any steady-state term in the process flow (as opposed to the proportional component, which goes to zero with error $s_E$, the integral component goes to zero with the steady state term). The derivative component is proportional to a rate of change of $s_E$, and provides a damping functionality that can be adjusted to balance response time with any tendency to overshoot the setpoint.

The PID routine typically yields a digital control signal (CTRL-D), which may be converted to analog control output CTRL-A as described above for D/A 15D of FIG. 1. The magnitude of control output CTRL-A is determined according to a set of D/A calibration parameters which are complementary to those employed for A/D conversion in signal processing (step 32, above).

The object of the control diagnostic signal, like that of the flow diagnostic signal, is to directly indicate an operational condition of the flow control system. In the case of the control diagnostic signal, this may be a condition of electromechanical wear and tear on the valve controller, electromechanical deterioration, or another impairment such as valve sticking or valve instability. Typically, these conditions are manifested by changes in the valve response function, which relates the control output and the setpoint for the process flow rate, as determined by the PID routine. Thus, for example, the control diagnostic signal may comprise a response function that is a ratio of a pulse-width modulated control output to setpoint $s_0$, or a another functional relationship of these quantities. Alternatively, the response function may relate the control output to a representative flow signal rather than to the setpoint.

Process output PR-OUT comprises at least one of flow diagnostic output DGN-F or control diagnostic output DGN-C. The process output may comprise, for example, a logical output D indicative of a departure of either the flow diagnostic signal or the control diagnostic signal from a respective nominal operating range. The nominal range may be determined a priori, or, alternatively, by a baseline response function or threshold function $f_0$ determined during a learning period. Thus, $$D = D(f, f_0), \quad [6]$$

where $f$ is a generalized diagnostic function comprising either the flow diagnostic signal or the control diagnostic signal, or both, and $f_0$ is a diagnostic threshold function determined during the learning period.

Diagnostic function $f$ may represent, for example, an inverse signal-to-noise ratio $R^{-1}$ or a response function. In these embodiments logical output D may return a true value when either the inverse-signal-to-noise ratio or the response function substantially exceeds its corresponding threshold value, as characterized by $f_0$. In contrast to the prior art, this diagnostic output is directly indicative of an impaired operational condition, independent of indirect measures such as service hours or number of valve cycles.

In other embodiments, process output PR-OUT may be an analog output or quasi-analog digital output comprising DGN-F or DGN-C, or both. In these embodiments PR-OUT may be directly representative of, for example, an inverse signal-to-noise ratio, a valve response function, or both. This provides a continuous (or quasi-continuous) indicator of the flow control system's operational condition, which is directly related to conditions of impaired operation such as flow obstructions, corrosion, and electromechanical wear and tear or deterioration.

Process output PR-OUT may also comprise a combination of logical, analog, and digital outputs, as representative of any combination of diagnostic outputs DGN-F, DGN-C, and related logical signals. Alternatively, in an embodiment in which process output PR-OUT comprises a unitary standard analog output, the process output may comprise flow output FLO when logical output D is false, and an error output when D is true.

FIG. 4 is a plot of flow signal 41 versus time, illustrating a time-dependent noise component due to a state of impaired flow. Flow signal 41 in plot 40 is represented by a large number of individual elements $s_i$, as may be comprised within several analysis windows or subsets $\{s_i\}$. The flow signal spans first nominal region 42A, second nominal region 42B, and impaired operational region 43.

FIG. 4 assumes an A/D clocking rate of many times per second, but clocking may occur at any rate appropriate to the particular fluid processing application of interest. Flow signal 41 is also shown with respect to a sixteen-bit binary range (that is, from 0 to 65,535) and a standard analog scale (from 4 to 20 mA), but these ranges are also merely illustrative. Further, while FIG. 4 indicates a generally linear relationship between the digital sensor signal and the analog output, this relationship may also be bi-linear, logarithmic, or have a more general form.

First nominal region 42, spanning a domain from approximately 0 sec to approximately 7 sec, is characterized by mean flow signal <s> corresponding to an analog output between 10 mA and about 15 mA. This represents a period of relatively constant and moderate process flow. The noise component, as characterized by inverse-signal-to-noise ratio $R^{-1}$, is on the order of ten percent.

In second nominal region 42B, between approximately 7 sec and approximately 18 sec, mean signal <s> corresponds to an analog output between 16 mA and about 18 mA. The noise component scales with the mean, as is characteristic of a wide range of noise contributions, such that the inverse signal-to-noise ratio remains approximately constant at around ten percent. Alternatively, the noise component may scale with the root of the mean signal, or may not scale with the signal size. Such relationships may be accommodated by a modified inverse signal-to-noise ratio based on the root of the mean signal size, or, alternatively, a diagnostic output representative of the standard deviation itself.

Impaired region 43 extends from approximately 18 sec to the end of the plot. In region 43 the mean signal decreases and the standard deviation increases, such that the inverse signal-to-noise ratio approaches one. This increase, particularly when coupled with a decrease in the mean signal size, is a direct indicator of an impaired operating condition such as a flow obstruction in a sensor tube. Such obstructions may occur independently of flow in the main passage, resulting in operational bias. This bias is manifest in direct indicators such as the inverse signal-to-noise ratio, but is not manifested by indirect indicators such as total service hours. Similarly, an aberrant response function (that is, an abnormally high control output for a given flow rate) can directly indicate an impaired valve condition, while the number of valve cycles cannot.

Note that a faulty valve controller may also produce crosstalk on the sensor signal, and thus be indicated in a flow diagnostic signal as well. Likewise, corrosion or obstructions in the flow sensor may bias valve controller performance, and so be manifested in a control diagnostic signal. More broadly, obstructions and corrosion can affect both the flow sensor and the valve controller, as can electromechanical deterioration. Thus while the flow diagnostic signal and the control diagnostic signal are nominally directed toward different aspects of flow control, the two are closely related and each is independently and directly representative of the flow control system's overall operational condition.

Operational impairments can also arise over time, rather than suddenly. This may be particularly true, for instance, in the case of gradual corrosion in a sensor tube, or long-term wear and tear on a valve coil assembly. In such cases a diagnostic output that is directly indicative of the flow controller's condition distinguishes between devices that have actually experienced some impairment, and devices which have not, regardless of service hours or number of valve cycles. Such direct diagnostic indicators facilitate cost-effective maintenance planning, and, by directing resources on an individual, rather than statistical basis, can also improve overall system performance while reducing total downtime.

Although the present invention has been described with reference to preferred embodiments, the terminology used is for the purposes of description, not limitation. Workers skilled in the art will recognize that changes may be made in form and detail without departing from the spirit and scope of the invention.

The invention claimed is:

1. A flow control system comprising:
   a flow sensor configured to generate a sensor signal characterizing a flow rate;
   a valve controller configured to control the flow rate as a function of a control output;
   a signal processor configured to convert the sensor signal into a flow signal characterizing the flow rate as a function of time;
   a control processor configured to generate the control output as a function of a setpoint and the flow signal; and
   an interface configured to receive an input representative of the setpoint and to transmit a flow output representative of the flow signal, flow diagnostic indicative of an operational condition of the flow control system and a control diagnostic indicative of an operational condition of the flow controller;
   wherein the flow diagnostic is based on an inverse signal-to-noise ratio of a standard deviation of the flow signal to a mean of the flow signal, and the control diagnostic is based on a response function relating the control output to at least one of the setpoint and the flow signal.

2. The flow control system of claim 1, wherein the flow diagnostic is indicative of a flow obstruction.

3. The flow control system of claim 1, wherein the response function comprises a proportional-integral-derivative routine performed on the setpoint as compared to the flow signal.

4. The flow control system of claim 3, wherein the control diagnostic is indicative of wear and tear on the valve controller.

5. The flow control system of claim 1, wherein the flow sensor comprises a mass flow sensor.

6. The flow control system of claim 1, wherein the flow sensor comprises a Coriolis flow sensor.

7. The flow control system of claim 1, further comprising an integrated controller housing for housing the flow sensor, the valve controller, the signal processor, the control processor and the interface, and wherein the valve controller comprises one of a valve positioner, a valve actuator and a valve coil assembly.

8. The flow control system of claim 1, wherein the flow diagnostic is indicative of corrosion in the flow control system.

9. The flow control system of claim 1, wherein the control output comprise a pulse-width modulated control output and the response function comprises a ratio of the pulse-width modulated control output to the setpoint.

10. The flow control system of claim 9, wherein the control diagnostic is indicative of valve sticking or instability in the valve controller.

11. A flow controller comprising a flow sensor for generating an analog sensor signal;
   an analog-to-digital converter for converting the analog sensor signal to a digital sensor signal;
   a digital-to-analog converter for converting a digital control signal to an analog control output;
   a valve controller for controlling a valve as a function of the analog control output;
   a microprocessor for generating a flow signal as a function of the digital sensor signal, for generating the digital control signal as a function of a setpoint and the flow signal, and for generating first and second diagnostic signals indicative of an operational condition of the flow controller, wherein the first diagnostic signal is based on an inverse signal-to-noise ratio of a standard deviation of the flow signal to a mean of the flow signal and the second diagnostic signal is based on a response function relating the control output to at least one of the setpoint and the flow signal; and
   an interface for receiving an input representative of the setpoint and for transmitting an output representative of the flow signal and the first and second diagnostic signals.

12. The flow controller of claim 11, wherein the operational condition comprises one or more of a flow obstruction or corrosion within the flow controller.

13. The flow controller of claim 11, wherein the operational condition comprises electromechanical deterioration within the flow controller.

14. The flow controller of claim 11, further comprising an integrated flow controller housing for housing the analog-to-digital converter, the digital-to-analog converter, the valve controller, the microprocessor and the interface.

15. The flow controller of claim 14, wherein the flow sensor comprises a thermal mass flow sensor.

16. The flow controller of claim 14, wherein the flow sensor comprises a Coriolis flow sensor.

17. The flow controller of claim 14, wherein the valve controller comprises a valve coil assembly.

18. The flow controller of claim 11, wherein the response function comprises a proportional-integral-derivative routine performed on the setpoint as compared to the flow signal.

19. The flow controller of claim 11, wherein the analog control output comprises a pulse-width modulated control output and the response function comprises a ratio of the pulse-width modulated control output to the setpoint.

20. A method of flow control, the method comprising:

generating a flow signal that characterizes a process flow rate as a function of time;

receiving an input representative of a setpoint for the process flow rate;

controlling the process flow rate as a function of a response function relating the setpoint and the flow signal;

generating a flow diagnostic signal that is indicative of an operational condition of the process flow rate, wherein the flow diagnostic signal is based on an inverse signal-to-noise ratio of a standard deviation of the flow signal to a mean of the flow signal;

generating a control diagnostic signal that is indicative of the operational condition of the process flow rate, wherein the control diagnostic signal is based on the response function; and transmitting an output that is representative of the flow signal, the flow diagnostic signal and the control diagnostic signal.

21. The method of claim 20, wherein the response function comprises a proportional-integral-derivative routine performed on the setpoint as compared to the flow signal.

22. The method of claim 20, wherein controlling the process flow rate comprises controlling the process flow rate as a function of a pulse-width modulated control output based on the setpoint and the flow signal, and wherein the response function comprises a ratio of the pulse-width modulated control output to the setpoint.

* * * * *